United States Patent [19]

Panella

[11] Patent Number: 5,207,014
[45] Date of Patent: May 4, 1993

[54] MULTI-PURPOSE FISHING TOOL

[76] Inventor: John Panella, 250 NE. 160 St., North Miami Beach, Fla. 33162

[21] Appl. No.: 930,368

[22] Filed: Aug. 17, 1992

[51] Int. Cl.⁵ ............................................. A01K 97/00
[52] U.S. Cl. ............................................. 43/4; 7/106; 7/132; 7/158
[58] Field of Search .............. 43/4, 53.5; 30/134, 30/135, 391; 7/106, 132, 134, 125, 158, 170, 133

[56] References Cited

U.S. PATENT DOCUMENTS

| | | | |
|---|---|---|---|
| 276,793 | 5/1883 | Erdman et al. | 7/132 |
| 525,460 | 9/1894 | House | 7/134 |
| 1,206,198 | 11/1916 | Bernard | 7/133 |
| 1,804,149 | 5/1931 | Clemens | 7/134 |
| 2,753,741 | 7/1956 | Riley | 7/106 |
| 4,208,749 | 6/1980 | Hermann | 7/106 |
| 4,796,318 | 1/1989 | Bigej | 7/106 |
| 5,084,935 | 2/1992 | Kalthoff | 7/132 |

*Primary Examiner*—Kurt C. Rowan
*Attorney, Agent, or Firm*—Malloy, Downey & Malloy

[57] ABSTRACT

A multi-purpose fishing tool, to be used to perform numerous, often encountered tasks, while fishing, the tool including primarily a pliers having a pair of arms pivotally attached to one another at corresponding central portions, and a pair of opposing clamp heads, one of the clamp heads including a cutting blade protruding from a top surface thereof. The clamp heads each further include an outer face, an inner face having a gripping surface, and a pair of opposite side faces. A punch seat protrudes from a side face of a bottom one of the clamp heads, and includes a vertical bore extending therethrough disposed such that a punch cone, extending downwardly from a corresponding side face of the upper clamp head, will pass into the vertical bore when the clamp heads are drawn together to a closed, clamping position, thereby causing the eyelet of a fishing hook positioned on an upper supporting surface of the punch seat to be enlarged. Additionally, a first shearing block and a second shearing block protrude from corresponding side faces of the top and bottom clamp heads and are disposed such that when the clamp heads are drawn together to the closed position, a bottom shearing edge of the first shearing block and a corresponding top shearing edge of the second shearing block pass in close, shearing relation to one another so as to cause a segment of wire extending therebetween to be effectively cut by the shearing blocks.

4 Claims, 1 Drawing Sheet

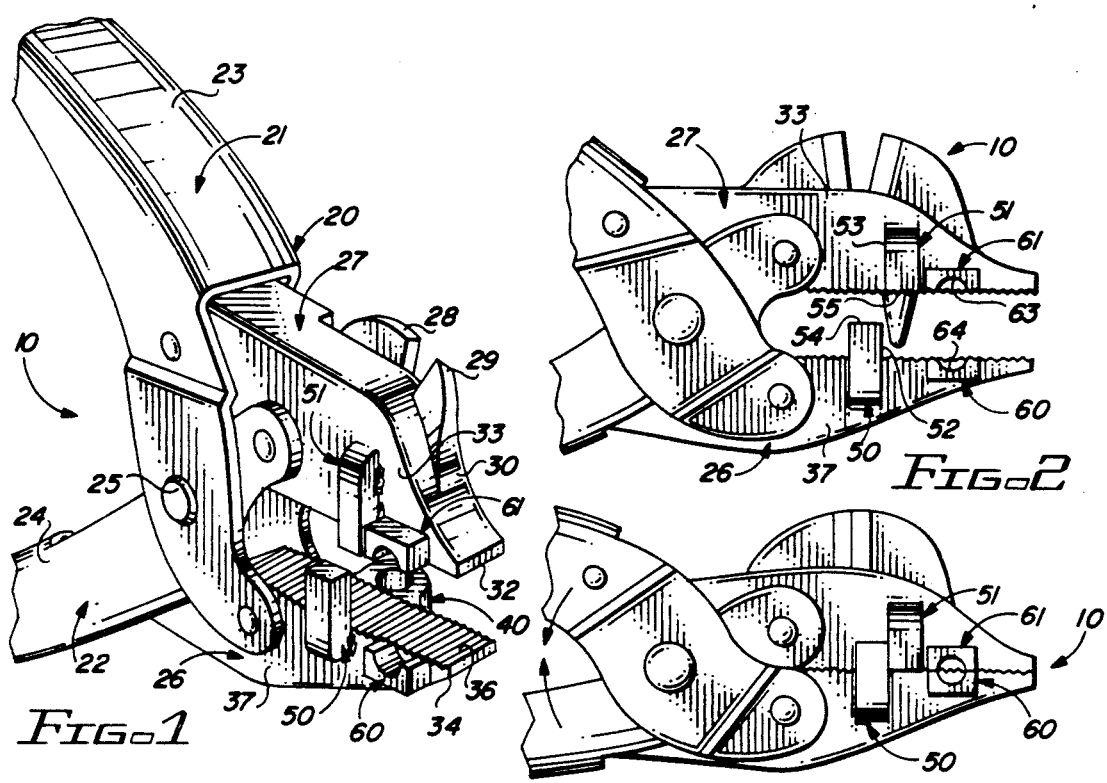
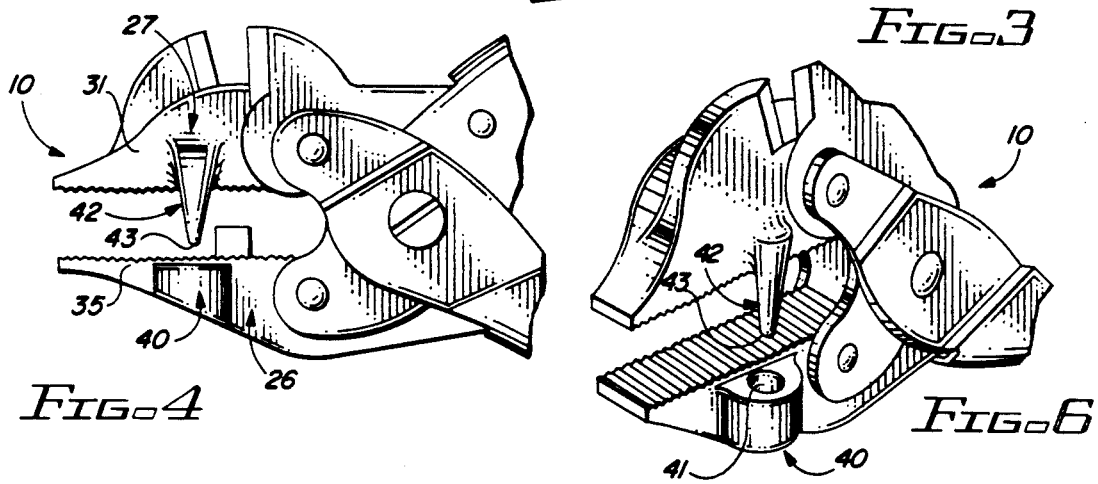
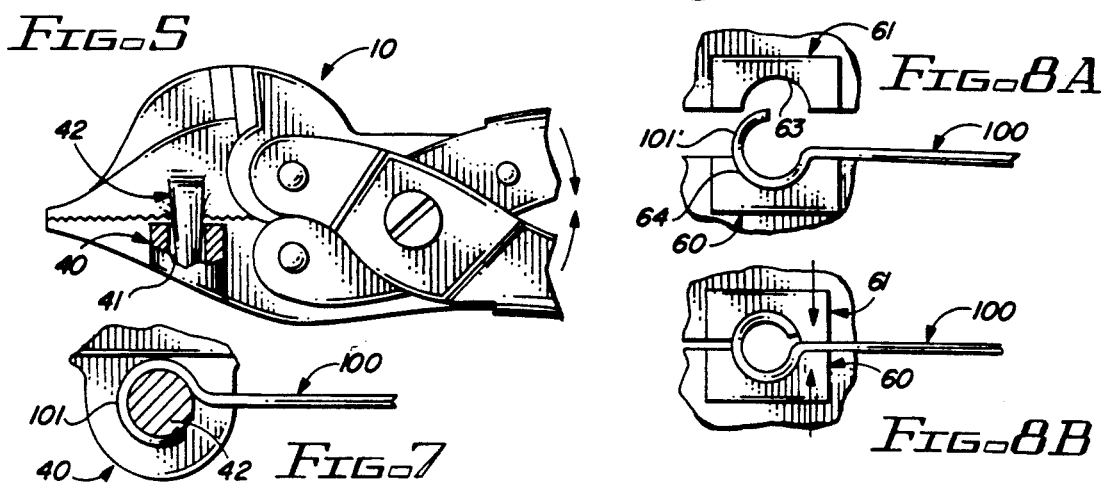

MULTI-PURPOSE FISHING TOOL

BACKGROUND OF THE INVENTION

1. Field of the Invention

The present invention relates to a multi-purpose fishing tool, to be used to perform a variety of tasks often encountered during fishing, thereby providing a user with a single effective tool which can cut wire, hooks, filament and the like appropriately and with minimal wear on the tool, as well as to facilitate the manipulating of fish hooks and eyelets thereof for easy adaptation to specifically desired uses.

2. Description of the Prior Art

Fishing pliers are an often used, almost essential tool carried and used by virtually all fisherman. They are highly desired for their multi-purpose use in performing many common tasks such as bending fish hooks for making fishing lures or jigs. Common fishing pliers include a standard plier gripper portion with a pair of scissor-type cutting blades which are intended for use in cutting monofilament fishing line. While primarily intended to cut monofilament, the cutting blades are often abused for use in cutting wire or hooks, a practice which leads to rapid dulling of the blades and often cause notches to form in the blades such that when attempting to use the cutters for their intended purpose, namely cutting monofilament, the blades become ineffective.

Further, there are many tasks which fishermen regularly perform which require intricate manipulations of fishing hooks, tasks that the standard pliers cannot easily and efficiently perform. For this reason, it would be highly beneficial to provide a fishing tool, which in addition to including the well-known and beneficial features, includes structural features which are specially adapted to assist in the performing of many other common fishing activities and will prolong the effectiveness of the fishing tool by minimizing the misuse of the existing features. The present invention is adapted to be such a tool.

More particularly, the tool of the present invention includes a specifically adapted punch assembly which is specifically designed for expanding the eyelet of a hook so as to facilitate the interlinking of multiple hooks to make a jig. Additionally, the tool includes shearing blocks which are specifically adapted to cut fish hooks, thick wire, and the like such that the blades of scissor-like cutters will be preserved for their intended use. These specifically adapted features, along with additional structural features, enable the tool of the present invention to have a more effective and increased use, while not requiring multiple tools or complicated manipulations.

SUMMARY OF THE INVENTION

The present invention is directed towards a multi-purpose fishing tool to be used to perform a variety of tasks often encountered while fishing. This tool includes primarily a pliers having a pair of arms pivotally attached to one another at corresponding central portions. Included between the central portion and a proximal end of each of the arms is a handle portion to facilitate gripping and squeezing of the pliers. Extending from the central portion of each of the arms, and opposite the handle portions, are a pair of opposing clamp heads which move between an open position and a closed, clamping position upon pivotal movement of the arms. Protruding from a top of one of the clamp heads is a pair of oppositely disposed, scissor-type cutting blades adapted for cutting monofilament fishing line. Protruding from a first side face of a bottom one of the clamp heads is a punch seat, including an upper surface adapted to receive an eyelet of a fishing hook supportably thereon. A vertical bore extends therethrough and is positioned so as to enable the eyelet to correspondingly overlay the bore. Disposed on a first side face of an upper one of the clamp heads is a punch cone. The punch cone, which is generally conically shaped, includes a punch tip which extends downwardly beyond the inner face of the upper clamp head and is positioned such that when the clamp heads are drawn together to the closed position, the punch tip of the punch cone passes into the bore in the punch seat. As a result of the relative movement therebetween, a fishing hook eyelet positioned on the upper surface of the punch seat over the bore will be enlarged when the punch cone passes therethrough into the punch seat.

Included on a second side face of the upper clamp head is a first shearing block, and included on the second side face of the bottom clamp head is a second shearing block. The first shearing block has a main inner face and a bottom shearing edge, and the second shearing block includes a main inner face and a top shearing edge, both main faces being confrontingly disposed. More particularly, the first shearing block and second shearing block are disposed so that the confronting main faces are positioned in closely spaced relation to one another, thereby causing a segment of wire or the like positioned between the shearing blocks to be cut or sheared when the clamp heads are drawn together and the bottom edge of the first shearing block and the top edge of the second shearing block pass in close, shearing relation to one another.

It is an object of the present invention to provide a single, unitary tool to perform a variety of often encountered fishing tasks.

Yet another object of the present invention is to provide an effective means of cutting wire or thick fishing line without damaging the conventional scissor-type cutting blades which are primarily intended for use to cut monofilament fishing line and like material.

A further object of the present invention is to provide a facilitated means of manipulating and restructuring fish hooks, such as enlarging and later compressing an eyelet of a fishing hook when interconnecting or linking multiple fishing hooks together, without requiring awkward maneuvering which can lead to injuries as a result of the sharp end of the hook.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the multi-purpose fishing tool viewed from a second side face.

FIG. 2 is a view of the multi-purpose fishing tool in an open position.

FIG. 3 is a second side view of the multi-purpose fishing tool in a closed position.

FIG. 4 is a first side view of the multi-purpose fishing tool in an open position.

FIG. 5 is a first side, partial cutaway view of the multi-purpose fishing tool in a closed position.

FIG. 6 is an elevated perspective view of the multi-purpose fishing tool viewed from a first side face.

FIG. 7 is a top, cross-sectional view of the punch cone and punch of the present invention in use.

FIG. 8A is a side view of the crimping members of the present invention in an open position.

FIG. 8B is a side view of the crimping members of the present invention in a closed position.

Like reference numerals refer to like parts throughout the several views of the drawings.

DETAILED DESCRIPTION OF THE PREFERRED EMBODIMENT

Shown throughout FIGS. 1-8, the present invention is directed towards a multi-purpose fishing tool, generally indicated as 10. As shown in FIG. 1, the fishing tool 10 includes primarily a pliers 20 having a pair of arms 21 and 22 pivotally attached to one another at corresponding central portions 25. Extending from the central portion 25, towards a proximal end of each of the arms 21 and 22, are a pair of oppositely disposed handle portions 23 and 24. At an end of each of the clamp arms 21 and 22, opposite the handle portions 23 and 24 are a pair of clamp heads 26 and 27. These clamp heads 26 and 27 move between an open position and a closed, clamping position as result of the pivotal movement of the arms 21 and 22 about the central portion 25 when the handle portions 23 and 24 are squeezed or released. Each of these clamp heads 27 and 26, as illustrated in FIGS. 1-6, includes an outer face 30 and 34, opposite side faces 31, 33 and 35, 37 and inner faces 32 and 36, respectively. Each of those inner faces 32 and 36 includes a gripping surface so as to facilitate the securing of items therebetween. Additionally, protruding from the outer face 30 of the upper clamp head 27 are a pair of oppositely disposed, scissor-type cutting blades 28 and 29. These cutting blades 28 and 29 are specifically adapted to cut string, monofilament line, or other thin material.

Turning to FIGS. 4, 5 and 6, the bottom clamp head 26 includes a punch seat 40 protruding from a first side face 35 thereof. This punch seat 40, which is integrally formed with the clamp head 26, includes a vertical bore 41 extending therethrough. Correspondingly disposed on the upper clamp head 27, on its first side face 31, is a punch cone 42. The punch cone 42, which is integrally formed with the upper clamp head 27 and is generally conical in shape, and includes a distal punch tip 43 and is positioned directly over the punch seat 40 such that when the clamp heads 27 and 26 are drawn together to the closed, clamping position, the punch tip 43, and accordingly the punch cone 42, pass into the vertical bore 41. As best shown in FIG. 7, the punch seat 40 is specifically adapted with a supporting upper surface so as to support thereon the eyelet portion 101 of a fishing hook 100. The punch seat 40 is adapted to hold the eyelet 101 such that the vertical bore 41 is accessible through the opening of the eyelet 101, and accordingly, when the clamp heads 27 and 26 are drawn together, the punch tip 43 of the punch cone 42 will pass through the eyelet 101 and subsequently enlarge it as the punch cone 42 is continued to be forced downwardly into the punch seat 40. This enlarging of the eyelet 101 is a commonly employed procedure when attaching multiple hooks 100 together to form a multi-hook lure or jig.

Referring to FIGS. 1, 2 and 3, the fishing tool 10 includes a pair of crimping members 61 and 60. The first crimping member 61 is disposed on the side face 33 of the upper clamp head 27, and the second crimping member 60 is correspondingly disposed on the side face 37 of the bottom clamp head 26. The crimping members 61 and 60 each include a semi-circular recess 63 and 64 therein. As shown in FIGS. 8A and 8B, these recesses 63 and 64 are adapted to supportably hold therebetween an enlarged eyelet 101' such that when the clamp heads 27 and 26 are squeezed together, the enlarged eyelet 101 is compressed.

Finally, as best seen in FIGS. 2 and 3, the fishing tool 10 includes a pair of shearing blocks 51 and 50. The first shearing block 51 is disposed on a side face 33 of the upper clamp head 27 and includes a main face 53 and a bottom shearing edge 55. The second shearing block 50 is disposed on a side face 37 of the bottom clamp head 26 and includes a main face 52 and a top shearing edge 54. The first and second shearing blocks 51 and 50 are disposed such that their main faces 53 and 52 are in confronting, closely spaced relation to one another. As a result of the positioning of the shearing blocks 51 and 50, when the clamp heads 27 and 26 are drawn together, the bottom shearing edge 55 of the first shearing block 51 and the top shearing edge 54 of the second shearing block 50 pass in close shearing relation to one another such that an item such as a fishing line or even fishing hook positioned therebetween will be cut.

This multi-purpose fishing tool is to be formed of a strong durable material and all features ca be integrally formed with the individual clamp arms. Further, the particular positioning of a particular feature may be varied to maximize the appearance or efficiency of the tool 10. The multi-purpose fishing tool 10 as shown is the preferred embodiment, but variations consistent with the invention as claimed and the doctrine of equivalents should also be included.

Now that the invention has been described,

What is claimed is:

1. A multi-purpose fishing tool comprising:

a pliers including a pair of arms pivotally attached to one another at corresponding central portions and each including a handle portion between said central portion and a proximal end, said pliers further including a pair of opposing clamp heads each extending from said central portion of a corresponding one of said arms, opposite said handle portions, such that pivotal movement of said arms causes said clamp heads to move between an open position and a closed, clamping position, a pair of oppositely disposed, scissor-type cutting blades protruding from a top of one of said clamp heads, each of said clamp heads further including an outer face, an inner face having a gripping surface, and a pair of opposite side faces, a punch seat protruding from a first one of said side faces of a bottom one of said clamp heads, said punch seat including an upper surface adapted to receive an eyelet of a fishing hook supportably thereon, and a vertical bore extending therethrough, a punch cone protruding from a first one of said side faces of an upper one of said clamp heads, said punch cone being generally conically shaped and including a maximum diameter larger than the diameter of the eyelet of the fishing hook and a distal punch top extending downwardly beyond said inner face of said upper clamp head such that when said clamp heads are drawn together to said closed position, said punch tip of said punch cone passes into said bore in said punch seat, thereby causing the fishing hook eyelet positioned on said upper surface of said punch seat, over said bore, to be enlarged as a result of said punch cone passing therethrough into said punch seat, a first and a second shearing block, said first shearing block protruding from a second one of said side faces of said upper clamp head and including a main inner face and a bottom shearing edge, and said second shearing block protruding from a second one of said side faces on said bottom clamp head and including a main inner face and a top shearing edge, and said first shearing block being disposed on said upper clamp head and said second shearing block being disposed on said bottom clamp head such that said main face of said first block and said main face of said second block are disposed in confronting, closely spaced relation to one another, so as to cut a segment of wire or the lip positioned therebetween when said clamp heads are drawn together causing said bottom edge of said first block and said top edge of said second block to pass in close, shearing relation to one another.

2. A fishing tool as in claim 1 further including a first and a second crimping member, each of said crimping members including a primary crimping face, and said first crimping member being disposed on said first or second side face of said upper clamp head and said second crimping member being disposed on a corresponding first or second side face of said bottom clamp head such that said primary face of said first crimping member and said primary face of said second crimping member are disposed in confronting relation to one another so as to compress an enlarged fishing hook eyelet positioned therebetween when said clamp heads are drawn to said closed position.

3. A fishing tool as in claim 2 wherein said primary faces on said crimping members include a semi-circular recess.

4. A fishing tool as in claim 3 wherein said upper surface of said punch seat is flush with said inner face of said bottom clamp head.

* * * * *